(12) United States Patent
Gimat et al.

(10) Patent No.: US 10,041,196 B2
(45) Date of Patent: Aug. 7, 2018

(54) FIBROUS STRUCTURE WITH GROUPING OF FLOATS

(71) Applicants: SNECMA, Paris (FR); SAFRAN, Paris (FR)

(72) Inventors: Matthieu Gimat, Paris (FR); Yann Marchal, Melun (FR); Dominique Coupe, Le Haillan (FR)

(73) Assignees: SNECMA, Paris (FR); SAFRAN, Paris (FR)

( * ) Notice: Subject to any disclaimer, the term of this patent is extended or adjusted under 35 U.S.C. 154(b) by 0 days.

(21) Appl. No.: 15/026,287

(22) PCT Filed: Sep. 29, 2014

(86) PCT No.: PCT/FR2014/052449
§ 371 (c)(1),
(2) Date: Mar. 31, 2016

(87) PCT Pub. No.: WO2015/049449
PCT Pub. Date: Apr. 9, 2015

(65) Prior Publication Data
US 2016/0244897 A1    Aug. 25, 2016

(30) Foreign Application Priority Data

Oct. 1, 2013 (FR) .................................. 13 59476

(51) Int. Cl.
*D03D 25/00* (2006.01)
*B29C 70/22* (2006.01)
(Continued)

(52) U.S. Cl.
CPC ......... *D03D 25/005* (2013.01); *B29C 70/222* (2013.01); *B29C 70/224* (2013.01);
(Continued)

(58) Field of Classification Search
CPC ..................................................... D03D 25/00
See application file for complete search history.

(56) References Cited

U.S. PATENT DOCUMENTS

| 7,101,154 B2 | 9/2006 | Dambrine et al. |
| 7,241,112 B2 | 7/2007 | Dambrine et al. |

(Continued)

FOREIGN PATENT DOCUMENTS

| FR | 2 953 225 A1 | 6/2011 |
| WO | WO 2010/001003 A1 | 1/2010 |

(Continued)

OTHER PUBLICATIONS

International Search Report as issued in International Patent Application No. PCT/FR2014/052449, dated Dec. 11, 2014.

(Continued)

*Primary Examiner* — Andrew Piziali
(74) *Attorney, Agent, or Firm* — Pillsbury Winthrop Shaw Pittman LLP

(57) ABSTRACT

A fiber structure includes a blank portion formed as a single part by three-dimensional weaving between a first plurality of yarn layers and a second plurality of yarn layers, the blank portion corresponding to all or part of a fiber reinforcement preform for a part made of composite material. Outside the blank portion, the fiber structure includes one or more two-dimensional fabric layers, each two-dimensional fabric layer grouping together the yarns of a single layer belonging to at least the first plurality of yarn layers and situated outside the blank portion.

12 Claims, 9 Drawing Sheets

(51) Int. Cl.
*B29C 70/24* (2006.01)
*F01D 5/28* (2006.01)
*B29K 105/08* (2006.01)
*B29L 31/08* (2006.01)

(52) U.S. Cl.
CPC ............ *B29C 70/228* (2013.01); *B29C 70/24* (2013.01); *F01D 5/282* (2013.01); *B29K 2105/0845* (2013.01); *B29L 2031/082* (2013.01); *D10B 2101/08* (2013.01); *D10B 2101/12* (2013.01); *D10B 2505/02* (2013.01); *F05D 2300/603* (2013.01); *Y02T 50/672* (2013.01)

(56) References Cited

U.S. PATENT DOCUMENTS

2008/0206048 A1* 8/2008 Coupe .................... B29C 70/24
  415/200
2010/0189566 A1* 7/2010 Harrison ............... B29C 66/126
  416/241 R
2014/0369848 A1* 12/2014 Marchal ................. B29C 70/24
  416/230

FOREIGN PATENT DOCUMENTS

| WO | WO 2010/061140 A1 | 6/2010 |
| WO | WO 2013/088038 A2 | 6/2013 |
| WO | WO 2013/088039 A2 | 6/2013 |
| WO | WO 2013/104852 A2 | 7/2013 |

OTHER PUBLICATIONS

International Preliminary Report on Patentability and the Written Opinion of the International Searching Authority as issued in International Patent Application No. PCT/FR2014/052449, dated Apr. 5, 2016.

* cited by examiner

FIBROUS STRUCTURE WITH GROUPING OF FLOATS

CROSS-REFERENCE TO RELATED APPLICATIONS

This application is the U.S. National Stage of PCT/FR2014/052449, filed Sep. 29, 2014, which in turn claims priority to French patent application number 1359476, filed Oct. 1, 2013. The content of these applications are incorporated herein by reference in their entireties.

BACKGROUND OF THE INVENTION

The present invention relates to making parts out of composite material, and more particularly to making reinforcing fiber structures for such parts.

A field of application of the invention lies more particularly in making parts out of structural composite material, i.e. structural parts having fiber reinforcement that is densified with a matrix. Composite materials make it possible to make parts of overall weight that is less than the weight of the same parts when they are made out of metal material.

In the context of making fiber structures by three-dimensional weaving in order to constitute the fiber reinforcement of a composite material part, such as an aeroengine blade, it is necessary during the weaving of the structure to remove yarns both in the warp direction and in the weft direction in order to impart reductions in the thickness of the part, e.g. for the tang of a blade, so as to obtain a fiber preform that presents the almost final shape and dimensions of the blade (i.e. its "net shape"). During weaving, removing yarns leads to yarn layers appearing that are not woven (i.e. that are floated) and that are subsequently cut away during a second operation.

It is difficult and awkward to cut away the floats of each layer because of the lack of cohesion between the non-woven yarns belonging to a single layer. In order to perform cutting as close as possible to the outline of the preform but without damaging it, it is preferable to cut the yarns layer by layer, beginning with the layer present at the surface of the structure and continuing with the underlying layers. Such layer-by-layer cutting requires manual intervention by an operator who takes hold of and cuts the yarns in a given layer one by one.

OBJECT AND SUMMARY OF THE INVENTION

It is therefore desirable to be able to have fiber structures that make it easy to take hold of and manipulate all of the floats of a given layer so as to enable them to be cut quickly and accurately.

To this end, the invention proposes a fiber structure comprising a blank portion formed as a single part by three-dimensional weaving between a first plurality of yarn layers and a second plurality of yarn layers, said blank portion corresponding to all or part of a fiber reinforcement preform for a part made of composite material, the structure being characterized in that it includes one or more two-dimensional fabric layers, each two-dimensional fabric layer grouping together yarns of a single layer forming part at least of the first plurality of yarn layers after they have exited the blank portion, and in that each two-dimensional fabric layer extends outside the blank portion in the direction of the yarns of the layer of the first plurality of yarn layers grouped together in said two-dimensional fabric layer.

Thus, the non-woven yarns belonging to a single layer are locally grouped together by a two-dimensional fabric layer, thereby enabling all of the floats in a given layer to be taken hold of together and cut accurately.

In addition, because of the fiber structure of the invention, it is possible to envisage using a machine or a robot to cut the floats automatically, it being possible for the machine to take hold of all of the floats in a given layer reliably by means of the two-dimensional fabric layer and to position a cutting tool accurately where the floats are to be cut.

In an embodiment of the fiber structure of the invention, the yarns of the first plurality of yarn layers correspond to warp yarns, whereas the yarns of the second plurality of yarn layers correspond to weft yarns, and in that each two-dimensional fabric layer is adjacent to the blank portion. Under such circumstances, the yarns of a given layer are grouped together as close as possible to where they exit the blank portion. According to an aspect of this embodiment, within each two-dimensional fabric layer the yarns of a single layer of warp yarns are woven together with the yarns of a single layer of weft yarns.

In another embodiment of the fiber structure of the invention, each two-dimensional fabric layer is situated at a determined distance from the blank portion. According to an aspect of this embodiment, said structure further includes two-dimensional fabric layers grouping together weft yarns extracted from the blank portion and belonging to a single layer of weft yarns.

In another embodiment of the fiber structure of the invention, the yarns of the first plurality of yarn layers correspond to warp yarns whereas the yarns of the second plurality of yarn layers correspond to weft yarns, the blank portion including a portion of decreasing thickness and a portion of increasing thickness, warp yarns being extracted from the blank portion via the portion of decreasing thickness and being reinserted into the blank portion via the portion of increasing thickness, said structure including two-dimensional fabric layers grouping together the warp yarns extracted from the blank portion and belonging to a single layer of warp yarns. According to an aspect of this embodiment, each two-dimensional fabric layer includes a cutout oriented perpendicularly relative to the direction of the yarns of the first plurality of layers.

According to yet another embodiment, the yarns of the first plurality of yarn layers correspond to warp yarns whereas the yarns of the second plurality of yarn layers correspond to weft yarns, the blank portion including a portion of decreasing thickness and a portion of increasing thickness, weft yarns being extracted from the blank portion via the portion of decreasing thickness and being reinserted into the blank portion via the portion of increasing thickness, said structure including two-dimensional fabric layers grouping together the weft yarns extracted from the blank portion and belonging to a single layer of weft yarns. According to an aspect of this embodiment, each two-dimensional fabric layer includes a cutout oriented perpendicularly relative to the direction of the yarns of the first plurality of layers.

The invention also provides a method of fabricating a fiber structure comprising weaving as a single part a blank portion by three-dimensional weaving between a first plurality of yarn layers and a second plurality of yarn layers, said blank portion corresponding to all or part of a fiber reinforcement preform for a part made of composite material, the method being characterized in that it further comprises, outside the blank portion, weaving one or more two-dimensional fabric layers, each two-dimensional fabric layer grouping together yarns of a single layer forming part at least of the first plurality of yarn layers after they have exited the blank portion, and in that each two-dimensional fabric layer extends outside the blank portion in the direction of the yarns of the layer of the first plurality of yarn layers grouped together in said two-dimensional fabric layer.

In another implementation of the method of the invention, the yarns of the first plurality of yarn layers correspond to warp yarns, whereas the yarns of the second plurality of yarn layers correspond to weft yarns, each two-dimensional fabric layer being woven adjacent to the blank portion. According to an aspect of this implementation, within each two-dimensional fabric layer the yarns of a single layer of warp yarns are woven together with the yarns of a single layer of weft yarns.

According to another implementation of the method of the invention, each two-dimensional fabric layer is woven at a determined distance from the blank portion.

According to another implementation of the method of the invention, the yarns of the first plurality of yarn layers correspond to warp yarns whereas the yarns of the second plurality of yarn layers correspond to weft yarns, the blank portion including a portion of decreasing thickness and a portion of increasing thickness, warp yarns being extracted from the blank portion via the portion of decreasing thickness and being reinserted into the blank portion via the portion of increasing thickness, said method comprising weaving two-dimensional fabric layers grouping together the warp yarns extracted from the blank portion and belonging to a single layer of warp yarns. Under such circumstances, the method may also comprise forming a cutout in each two-dimensional fabric layer, the cutout being oriented perpendicularly relative to the direction of the yarns of the first plurality of layers.

In another implementation of the method of the invention, the yarns of the first plurality of yarn layers correspond to warp yarns whereas the yarns of the second plurality of yarn layers correspond to weft yarns, the blank portion including a portion of decreasing thickness and a portion of increasing thickness, weft yarns being extracted from the blank portion via the portion of decreasing thickness and being reinserted into the blank portion via the portion of increasing thickness, said method comprising weaving two-dimensional fabric layers grouping together the weft yarns extracted from the blank portion and belonging to a single layer of weft yarns. Under such circumstances, the method may also comprise forming a cutout in each two-dimensional fabric layer, the cutout being oriented perpendicularly relative to the direction of the yarns of the first plurality of layers.

The invention also provides a method of making a fiber reinforcement preform, the method being characterized in that it comprises the following steps:
fabricating a fiber texture by the method of the invention; and
taking hold of each two-dimensional fabric layer and cutting the yarns of each two-dimensional fabric layer at the limit of the blank portion(s) of the fiber structure.

BRIEF DESCRIPTION OF THE DRAWINGS

Other characteristics and advantages of the invention appear from the following description of particular embodiments of the invention given as non-limiting examples and with reference to the accompanying drawings, in which.

DETAILED DESCRIPTION OF EMBODIMENTS

The invention applies in general to making fiber structures suitable for constituting fiber reinforcement, or "preforms", for fabricating composite material parts, in particular aeroengine blades, the parts being obtained by densifying fiber structures with a matrix. The matrix is typically made of a resin, for composite materials that are used at relatively low temperatures, typically up to 300° C., or else it is made of a refractory material such as carbon or ceramic for thermostructural composites.

As described below in detail, the fiber structure of the invention includes a blank portion formed as a single part by three-dimensional weaving between a plurality of layers of warp yarns and a plurality of layers of weft yarns, the blank portion corresponding to all or part of a fiber reinforcement preform for a composite material part. In accordance with the invention, outside the blank portion, the fiber structure includes one or more layers of two-dimensional fabric, each layer of two-dimensional fabric comprising yarns in a single layer of warp yarns and/or of weft yarns lying outside the blank portion.

It should be recalled that weaving consists in interlacing warp yarns and weft yarns. In weaving terminology, the term "weave" designates a particular pattern for interlacing warp yarns and weft yarns.

In the present description, the term "three-dimensional weaving" (or "3D weaving") is used to designate a weaving technique in which at least some of the weft yarns link together warp yarns over a plurality of weft layers, and vice versa. Three-dimensional weaving thus differs from more conventional "two-dimensional weaving" (or "2D weaving") in that each weft or warp yarn passes from one side to the other of yarns in a single layer of warp or weft yarns, as when weaving satin or plain weave.

There are various three-dimensional weaving techniques that differ in the way in which the weft and warp yarns are interlaced. For example, three-dimensional weaving may be of the "interlock" or "multilayer" type. The term "interlock weaving" is used to designate 3D weaving with a weave in which each warp layer links together a plurality of weft layers with all of the yarns in the same warp column having the same movement in the plane of the weave.

Figure 1:
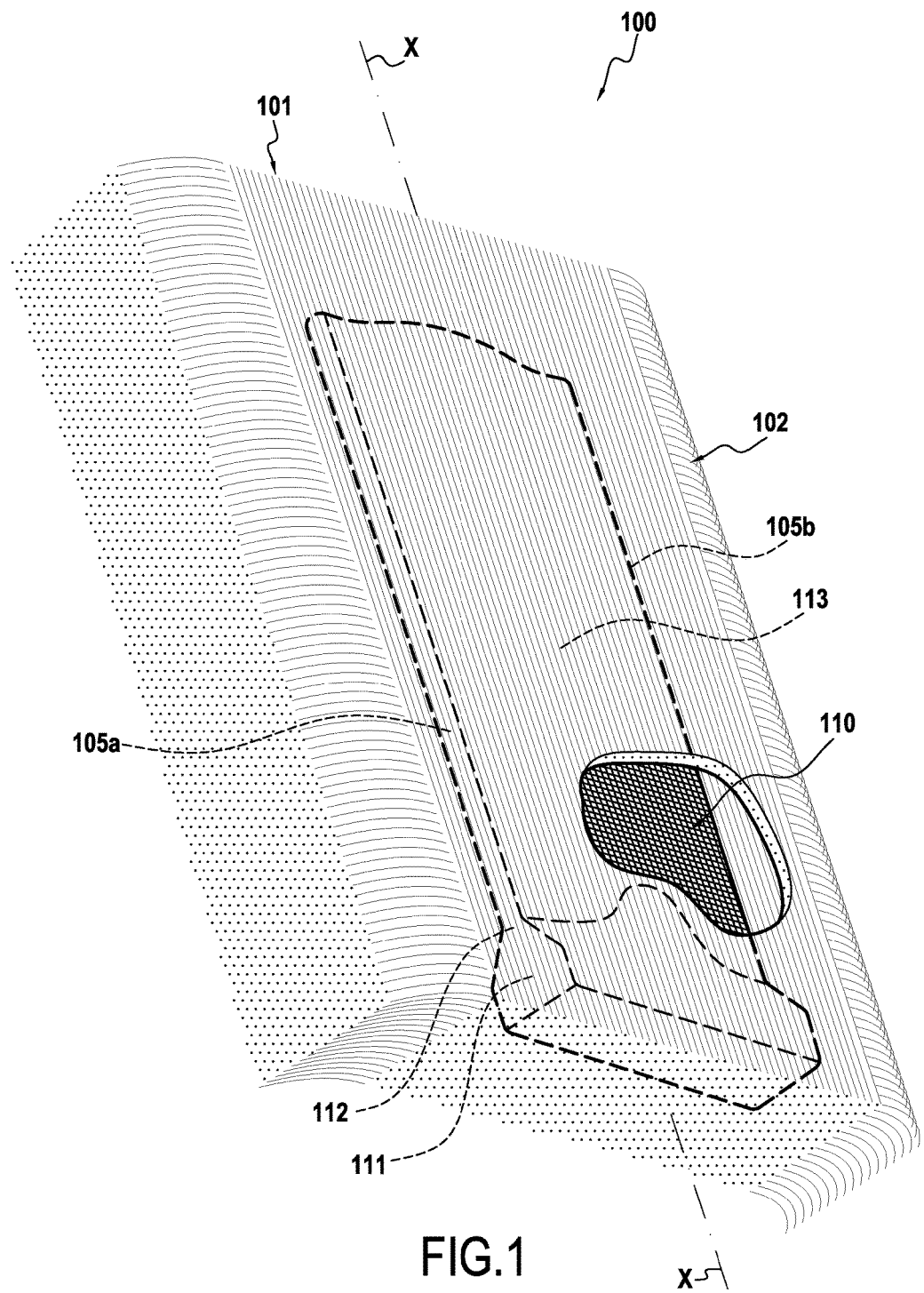
FIG. 1 is a diagrammatic view showing the multilayer weaving of a fiber structure for fabricating an aeroengine blade.

FIG. 1 is a very diagrammatic view of a fiber structure 100 leaving a prior art loom. The fiber structure 100 comprises a blank portion 110 formed as a single part by three-dimensional weave between a plurality of layers of warp yarns 101 and a plurality of layers of weft yarns 102, the blank portion 110 being intended, after the warp and weft yarns that lie outside the 3D woven blank portion have been cut away, to form the fiber reinforcement of an aeroengine blade. In its portion that is to form a root preform, the blank portion 110 presents extra thickness 111 determined as a function of the thickness of the root of the blade that is to be made. The blank portion 110 is extended by a portion 112 of decreasing thickness that is to form the tang of the blade, followed by a portion 113 that is to form the airfoil of the blade. In a direction perpendicular to the direction X, the portion 113 presents a profile of varying thickness between its edge 105a that is to form the leading edge of the blade and its edge 105b that is to form the trailing edge of the blade that is to be made.

Detailed embodiments of a fiber preform for forming the fiber reinforcement of a blade for an aeroengine are described in detail in Documents U.S. Pat. Nos. 7,101,154, 7,241,112, and WO 2010/061140, the content of which is incorporated herein by way of reference.

The fiber structure of the invention may particularly, but not exclusively, be woven from yarns made of carbon fibers or of ceramic fibers, such as silicon carbide fibers. The fiber content in the fiber structure is determined locally as a function of the density of yarns present at the location under consideration in the structure.

The blank portion 110 is woven as a single part and after cutting away the non-woven yarns situated outside the blank portion, it needs to present the almost-final shape and dimensions of the blade (i.e. the "net shape"). For this purpose, in the portions where the thickness of the fiber structure becomes reduced, as in the portion 112 of decreasing thickness, the decrease in the thickness of the preform is obtained by progressively removing layers of warp and weft yarns during weave.

Figure 2:
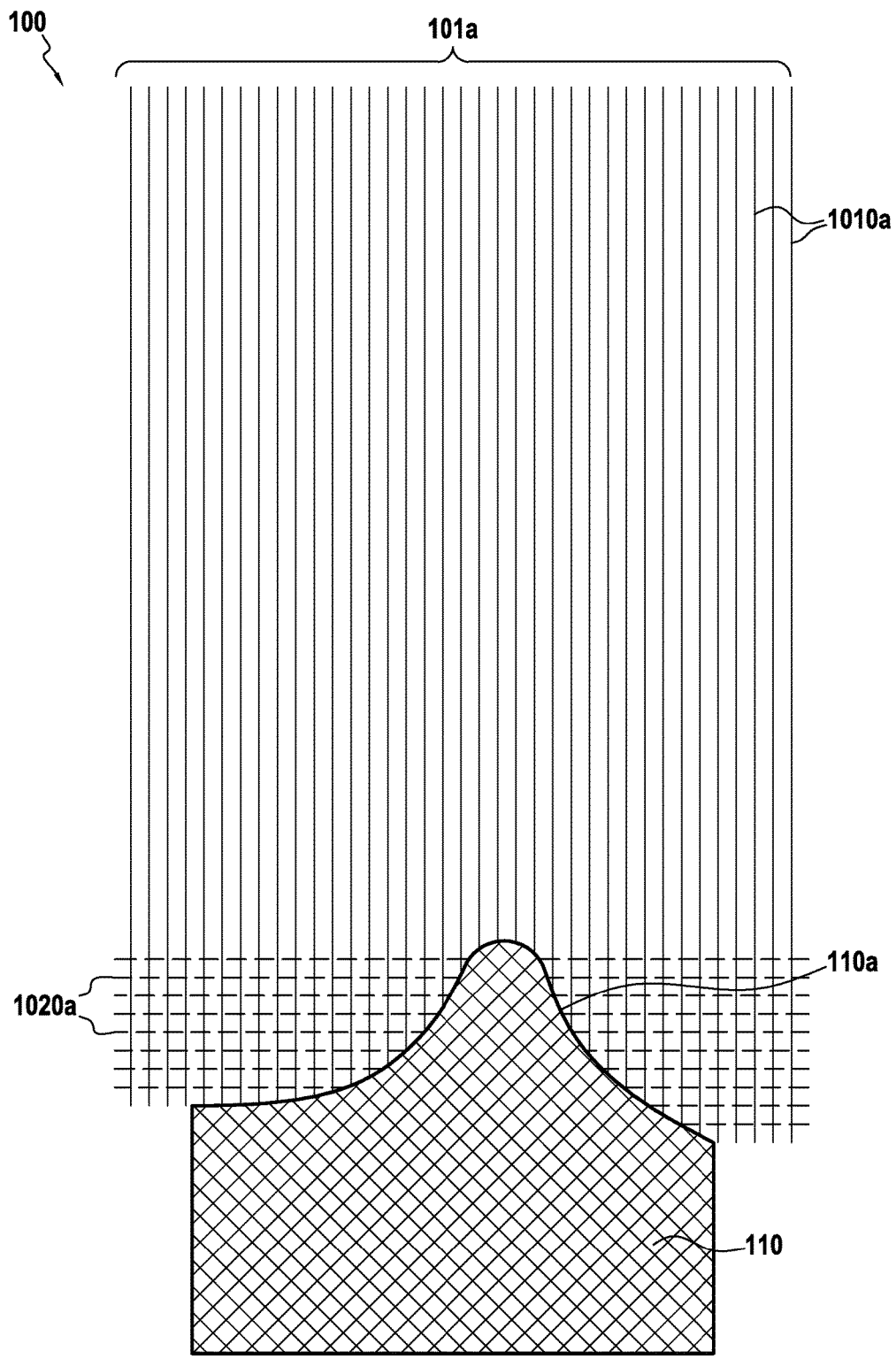
FIG. 2 is a diagrammatic plan view of the FIG. 1 fiber structure.

FIG. 2 shows the exit of a first layer of warp yarns 101a from the blank portion 110 at the beginning of the portion 112 of decreasing thickness. Other layers of warp yarns (not shown in FIG. 2) situated beneath the first layer of warp yarns shown in FIG. 2 are progressively caused to exit from the blank portion 110 as the portion 112 of decreasing thickness continues to be formed.

Outside the blank portion, beyond the outline 110a for the first layer of warp yarns 101a, the warp yarns 1010a of the layer 101a are no longer woven. More precisely, the weft yarns 1020a situated on either side of the outline 110a no longer link together the warp yarns of the layer 101a and they are left loose beneath the layer 101a. Outside the outline 110a, i.e. after the entire layer 101a has exited from the blank portion, there are no longer any weft yarns since the loom is no longer fed with weft yarns for the weft yarn layer that is to link together the warp yarns 1010a of the layer 101a in the blank portion.

In order to extract the preform for the blade fiber reinforcement from the fiber structure 100, it is necessary to cut away all of the non-woven yarns situated outside the blank portion 110. With the fiber texture of FIG. 1, it is difficult and awkward to cut the yarns of each layer of warp yarns and of each layer of weft yarns because of the lack of cohesion between the non-woven yarns belonging to any given layer. In order to perform cutting as close as possible to the outline of the blank portion, but without damaging it, it is preferable to cut the yarns layer by layer, beginning with the layer present at the surface of the structure and continuing with the underlying layers. This layer-by-layer cutting requires manual intervention by an operator who takes hold of the yarns of a given layer one by one and cuts them.

In order to make it easier to cut non-woven yarns situated outside the blank portion, the invention proposes linking the non-woven yarns of a given layer together by two-dimensional weaving. Thus, the yarns of a single layer situated outside the blank portion can be handled easily and they can be cut accurately and quickly. In the invention, the yarns of a single layer (layer of warp yarns or layer of weft yarns) situated outside the blank portion are woven together using two-dimensional weaving, immediately after they exit the blank portion or at some determined distance from the point where they exit the blank portion. Consequently, the yarns in a single layer of yarns (layer of warp yarns or layer of weft yarns) are woven together successively with three-dimensional weaving while they are inside the blank portion and with two-dimensional weaving while they are outside the blank portion.

Figure 3:
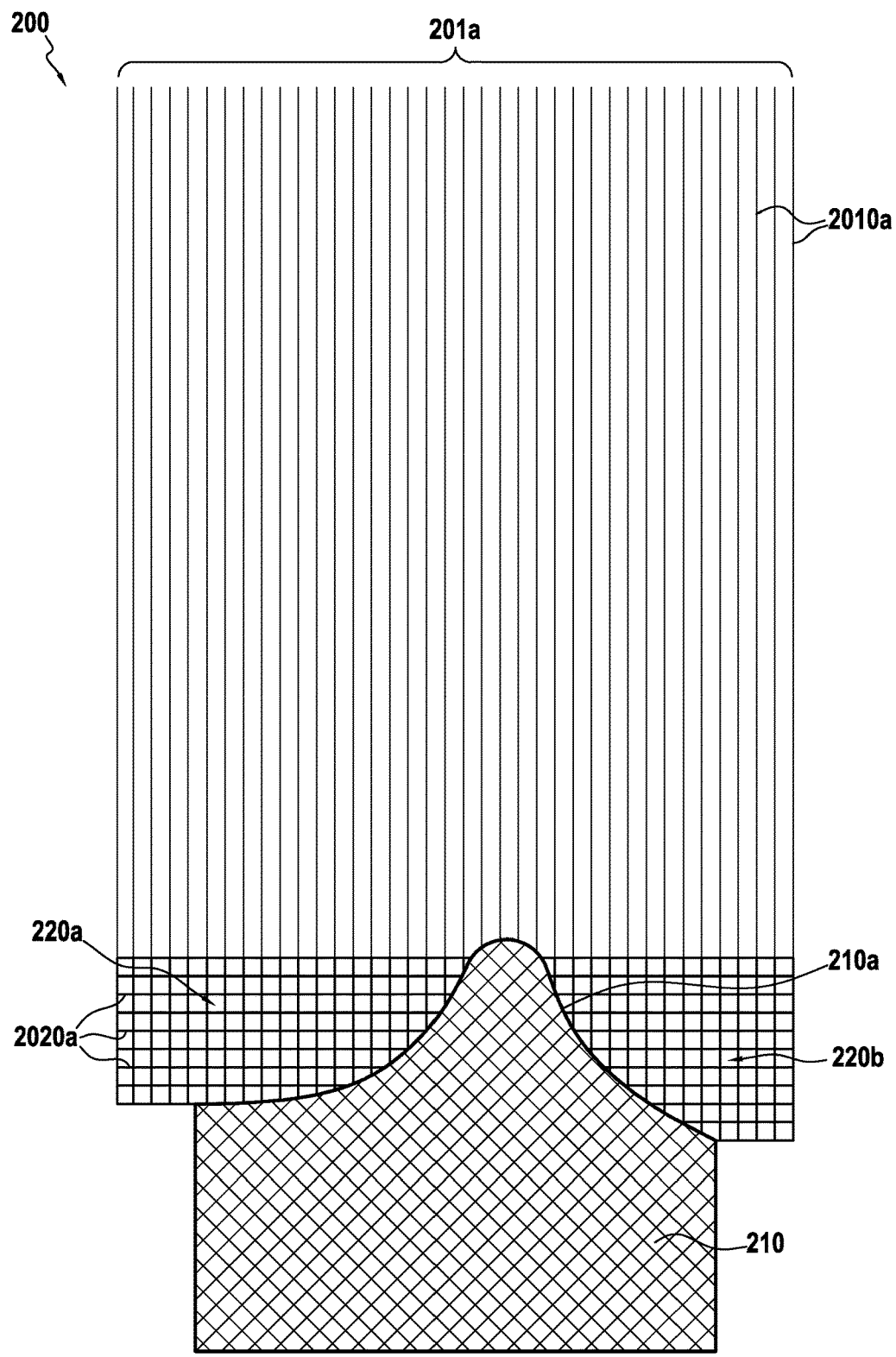
FIG. 3 is a diagrammatic view of a fiber structure in an embodiment of the invention.

FIG. 3 shows a first implementation of the invention with a fiber structure 200 similar to the above-described structure 100. The fiber structure 200 differs from the structure 100 of FIG. 2 in that the warp yarns 2010a of the first layer of warp yarns 201a are woven immediately after exiting the blank portion by means of a two-dimensional weave with the weft yarns 2020a used in the blank portion 210. This produces two layers of two-dimensional fabric 220a and 220b, e.g. of plain or satin weave, arranged respectively on either side of the end 210a of the blank portion 210. The layers 220a and 220b are easy to take hold of, and consequently the warp yarns 2010a of the first layer of warp yarns 201a that are not woven in the blank portion 210 can be cut quickly and accurately. Two-dimensional layers are also made in the same manner with the non-woven warp yarns of the bottom layers of warp yarns (not shown in FIG. 3).

Figure 4:
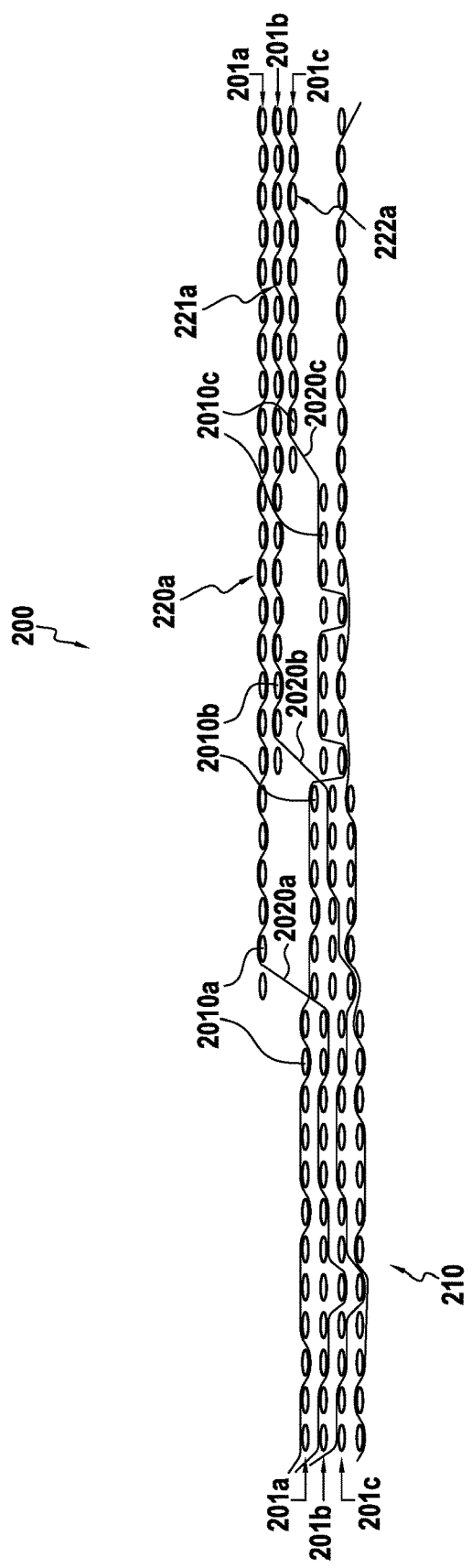
FIG. 4 is a weft section on a large scale of a portion of the FIG. 3 fiber structure.

FIG. 4 shows a weave plane of a portion of the fiber structure 200, the warp yarns being shown in section. FIG. 4 shows the successive exits of the first three layers of warp yarns 201a, 201b, and 201c from the blank portion 210. The warp yarns 2010a of the layer 201a situated outside the blank portion 210 are woven with weft yarns 2020a used for linking together a plurality of layers of warp yarns in the blank portion 210 so as to form a layer 220a of two-dimensional fabric.

Likewise, the warp yarns 2010b of the layer 201b situated outside the blank portion 210 are woven together with weft yarns 2020b coming from the blank portion 210 so as to form a layer 221a of two-dimensional fabric. Finally, the weft yarns 2010c of the layer 201c situated outside the blank portion 210 are woven together with weft yarns 2020c coming from the blank portion 210 so as to form a layer 222a of two-dimensional fabric.

Figure 5:
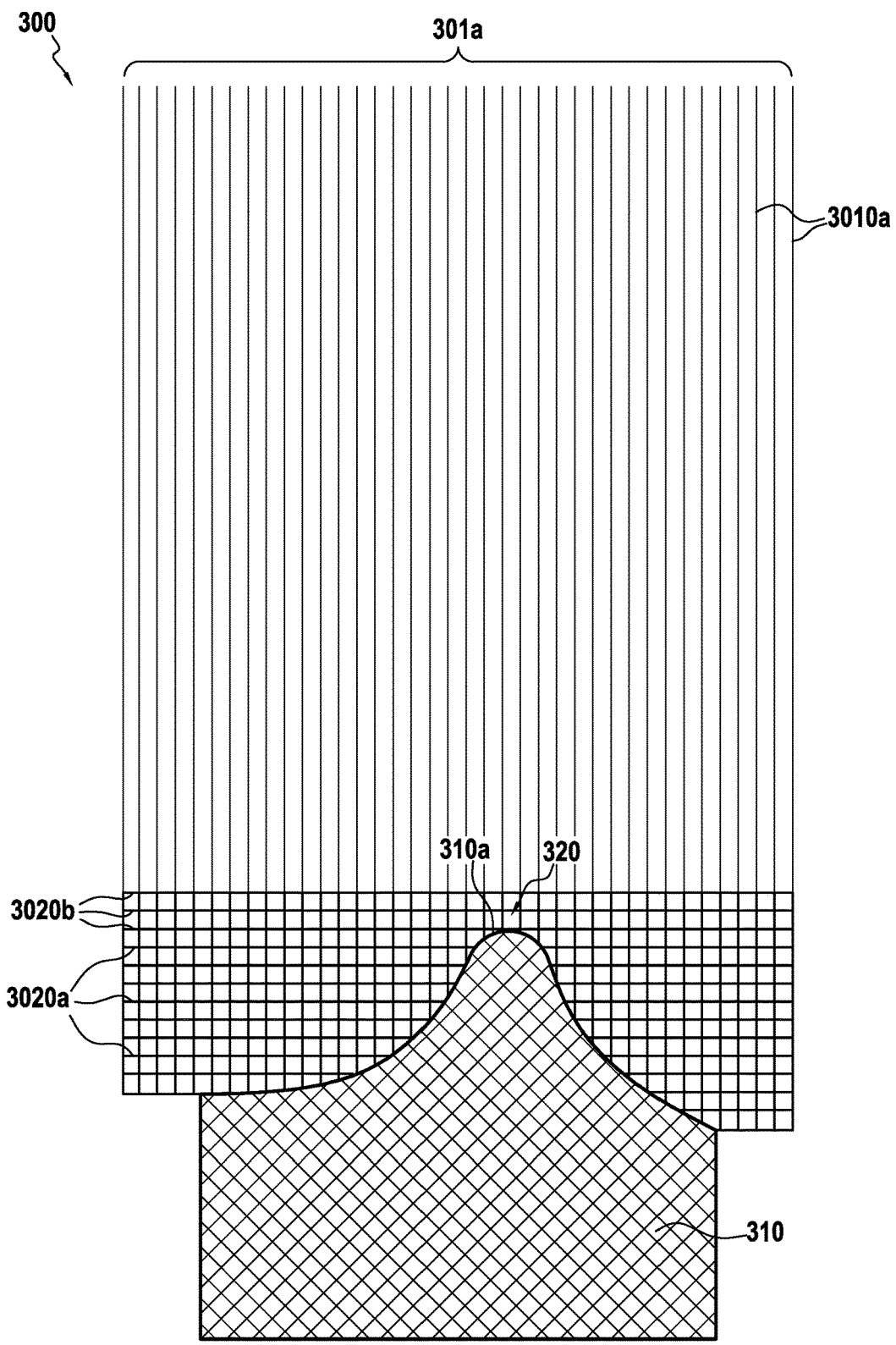
FIG. 5 is a diagrammatic view of a fiber structure in accordance with another embodiment of the invention.

In a variant shown in FIG. 5, a fiber structure 300 differs from the structure 200 of FIG. 3 in that additional weft yarns 3020b are used in two-dimensional weaving to link together the warp yarns 3010a of the first layer of warp yarns 301a beyond the end 310a of the blank portion 310, the warp yarns 3010a situated on either side of the blank portion 310 being linked together by two-dimensional weaving with weft yarns 3020a used for weaving the blank portion 310. This produces a two-dimensional fabric layer 320 that extends on both sides of the blank portion 310 and beyond its end 310a. The non-woven warp yarns in each layer of warp yarns situated beneath the layer 301a may be linked together by two-dimensional weaving with weft yarns in the same manner as for the non-woven warp yarns of the weft yarn layer 301a. The use of additional weft yarns beyond the blank portion makes it possible to use two-dimensional weaving to link together the non-woven warp yarns of a single layer of warp yarns over the entire width of the fiber structure in the weft direction, with it being possible for the warp yarns that are woven together in this way to be taken hold of and manipulated all together.

Figure 6:
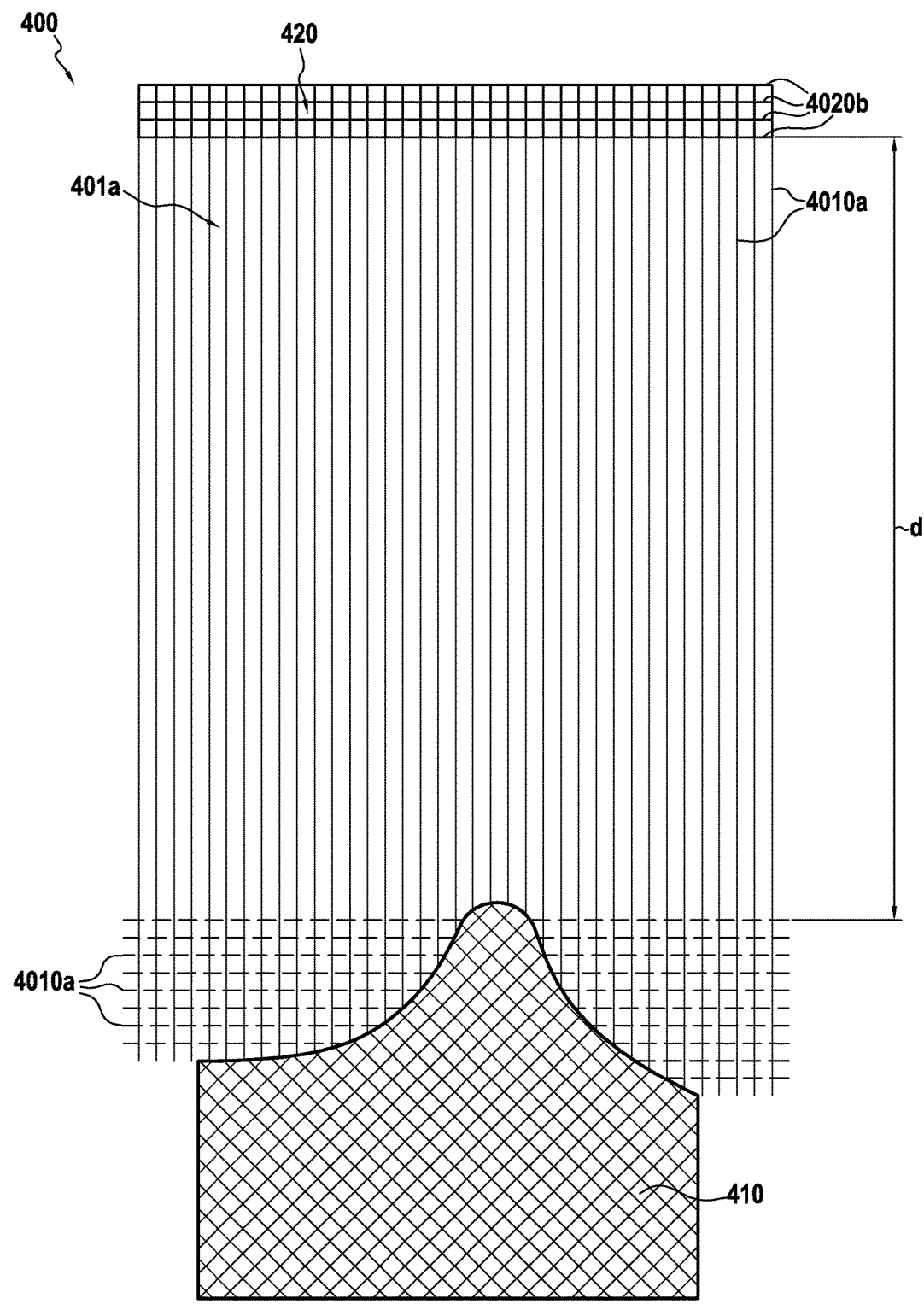
FIG. 6 is a diagrammatic view of a fiber structure in accordance with another embodiment of the invention.

FIG. 6 shows another implementation of the invention with a fiber structure 400 similar to the above-described structure 100. The fiber structure 400 differs from the structure 100 of FIG. 2 in that the warp yarns 4010a of the first warp yarn layer 401a situated outside the blank portion 410 are linked together by two-dimensional weaving after the blank portion 410 has been woven completely. For this purpose, additional weft yarns 4020b are added compared with the weft yarns 4020a provided in the weaving program for the blank portion 410, so as to use two-dimensional weaving to link together the non-woven warp yarns 4010a of the layer 401a in a zone that is remote from the exit from the blank portion 410. This produces a two-dimensional fabric layer 420 that is situated at a determined distance d from the blank portion. The non-woven warp yarns in each layer of warp yarns situated beneath the layer 401a can be grouped together by two-dimensional weaving with additional weft yarns in the same manner as for the non-woven warp yarns of the warp yarn layer 401a. Grouping together non-woven warp yarns from each of the layers of warp yarns in respective layers of two-dimensional fabric makes them easy to take hold of, and consequently enables the warp yarns of each layer of warp yarns that are not woven in the blank portion 410 to be cut quickly and accurately.

Figure 7:
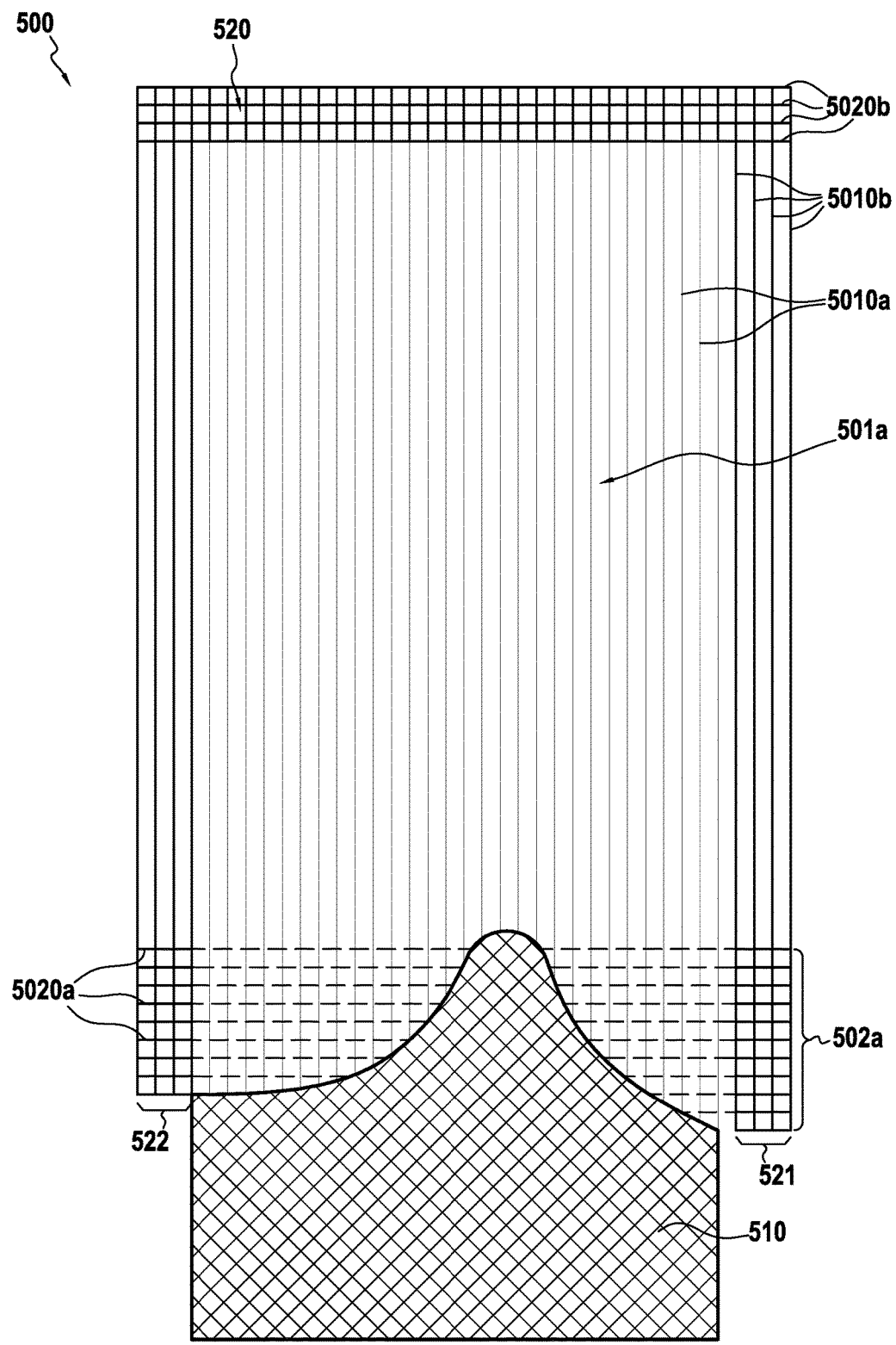
FIG. 7 is a diagrammatic view of a fiber structure in accordance with another embodiment of the invention.

In a variant shown in FIG. 7, a fiber structure 500 differs from the structure 400 of FIG. 6 in that additional warp yarns 5010b are used at the margin of the fiber structure 500 so as to link together by two-dimensional weaving the weft yarns 5020a of the first weft yarn layer 502a used for forming the blank portion 510, and also the additional weft yarns 5020b added compared with those provided in the program for weaving the blank portion in order to link together by two-dimensional weaving the non-woven warp yarns 5010a of the layer 501a in a zone remote from the exit from the blank portion 510. This produces a two-dimensional fabric layer 520 that is situated at a determined distance from the blank portion, and two two-dimensional fabric layers 521 and 522 that extend respectively along the longitudinal edges at the margins of the texture. The non-woven weft and warp yarns of the lower layers may be grouped together by two-dimensional weaving in the same manner.

Figure 8:
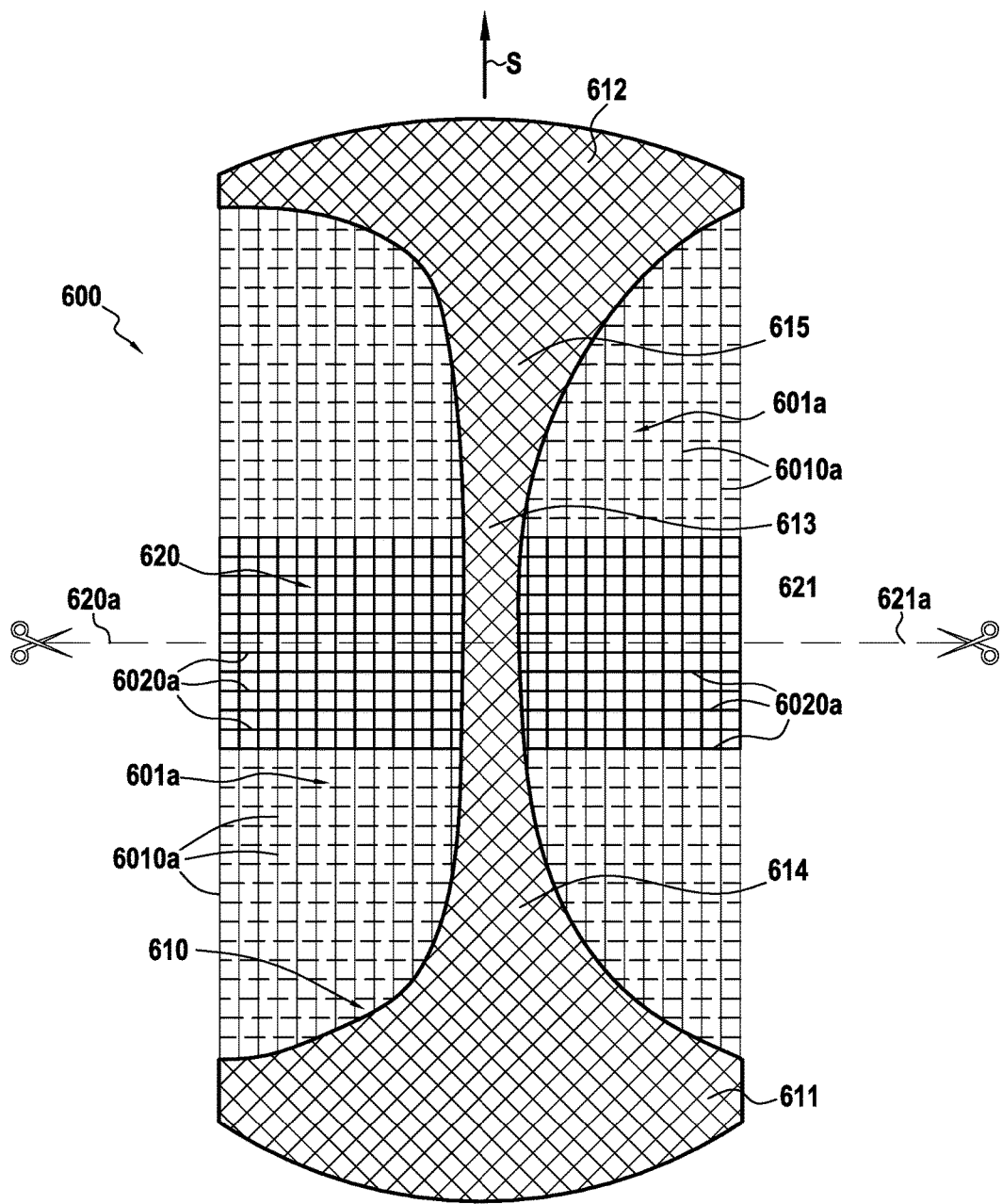
FIG. 8 is a diagrammatic view of a fiber structure in accordance with another embodiment of the invention.

FIG. 8 shows another implementation of the invention with a fiber structure 600 in which the blank portion 610 has two thick portions 611 and 612 at its ends that are to form respective blade platforms, together with a central portion 613 of small thickness that is to form the blade airfoil. In the weaving direction S, the blank portion 610 presents a portion 614 of decreasing thickness at the transition between the thick portion 611 and the thin portion 613, and also a portion 615 of increasing thickness at the transition between the thin portion 613 and the thick portion 612. Warp yarns 6010a of the first warp yarn layer 601a are extracted from the blank portion 610 in the portion 614 of decreasing thickness and they are reinserted into the blank portion in the portion 615 of increasing thickness. The same applies for the warp yarns of the lower warp yarn layers (not shown in FIG. 8). In accordance with the invention and in order to group together the warp yarns of the layer 601a that are extracted from the blank portion 610 between its portions 611 and 612, two two-dimensional fabric layers 620 and 621 are made respectively on either side of the thin portion with the weft yarns 6020a that are used for making the blank portion 610. In order to facilitate handling and cutting the warp yarns situated outside the blank portion 610, each two-dimensional fabric layer 620 and 621 may be cut along a line 620a or 621a. In a variant implementation, additional warp yarns (not shown in FIG. 8) may be used in the margins of the fiber structure with two-dimensional weaving to link together the weft yarns of the first layer of weft yarns used for forming the blank portion 610, as with the fiber structure 500 of FIG. 7.

Once the weaving of the fiber structure is finished, the blank portion of the fiber structure is extracted by cutting non-woven yarns by cutting yarns layer by layer in accordance with the invention so as to obtain a fiber preform that, in this example, is for constituting the fiber reinforcement of a blade.

Thereafter, the fiber preform is densified so as to form a composite material blade. Densifying the fiber preform that is to form the fiber reinforcement of the part that is to be fabricated consists in filling in the pores of the preform throughout part or all of its volume with the material that constitutes the matrix. This densification may be performed in conventional manner using a liquid technique or using chemical vapor infiltration (CVI), or indeed by using both methods one after the other.

The liquid technique consists in impregnating the preform with a liquid composition containing a precursor for the matrix material. The precursor is usually in the form of a polymer, such as a high performance epoxy resin, possibly diluted in a solvent. The preform is placed in a mold that can be closed in sealed manner and that has a cavity in the shape of the final molded blade. Thereafter, the mold is closed and the liquid precursor of the matrix (e.g. a resin) is injected throughout the cavity in order to impregnate the entire fiber portion of the preform.

The precursor is transformed into a matrix by heat-treatment, i.e. it is polymerized, generally by heating the mold, after eliminating the solvent, if any, and after curing the polymer, with the preform continuing to be maintained within the mold having a shape that corresponds to the shape of the part that is to be made.

When making a matrix out of carbon or ceramic, the heat treatment consists in pyrolyzing the precursor in order to transform the matrix into a carbon or ceramic matrix depending on the precursor used and on pyrolysis conditions. By way of example, liquid precursors for ceramic, and in particular for SiC, may be resins of the polycarbosilane (PCS) type or of the polytitanocarbosilane (PICS) type, or of the polysilazane (PSZ) type, whereas liquid precursors for carbon may be resins having a relatively high coke content, such as phenolic resins. A plurality of consecutive cycles running from impregnation to heat treatment may be performed in order to achieve the desired degree of densification.

In an aspect of the invention, in particular when forming an organic matrix, the fiber preform may be densified by the well-known resin transfer molding (RTM) method. In the RTM method, the fiber preform is placed in a mold having the outside shape of the part that is to be made. A thermosetting resin is injected into the inside space of the mold while it contains the fiber preform. A pressure gradient is generally established in this inside space between the location where the resin is injected and orifices for discharging the resin in order to control and optimize impregnation of the preform by the resin.

The fiber preform may also be densified in conventional manner by chemical vapor infiltration (CVI). The fiber preform corresponding to the fiber reinforcement of the blade that is to be made is placed in an oven into which a reaction gas phase is admitted. The pressure and the temperature that exist inside the oven and the composition of the gas phase are selected so as to enable the gas phase to diffuse within the pores of the preform and form the matrix therein by depositing a solid material in the core of the material in contact with the fibers, which solid material results from a component of the gas phase decomposing or from a reaction between a plurality of components, as contrasted to the pressure and temperature conditions that are specific to chemical vapor deposition (CVD) methods and that lead to deposition taking place exclusively at the surface of the material.

An SiC matrix may be formed using methyltrichlorosilane (MTS) that gives SiC by the MTS decomposing, whereas a carbon matrix can be obtained with hydrocarbon gases such as methane and/or propane that give carbon by cracking.

Densification by using both a liquid technique and a gaseous technique can also be performed in order to facilitate working, limit costs, and shorten fabrication cycle times, while still obtaining characteristics that are satisfactory for the intended utilization.

Figure 9:
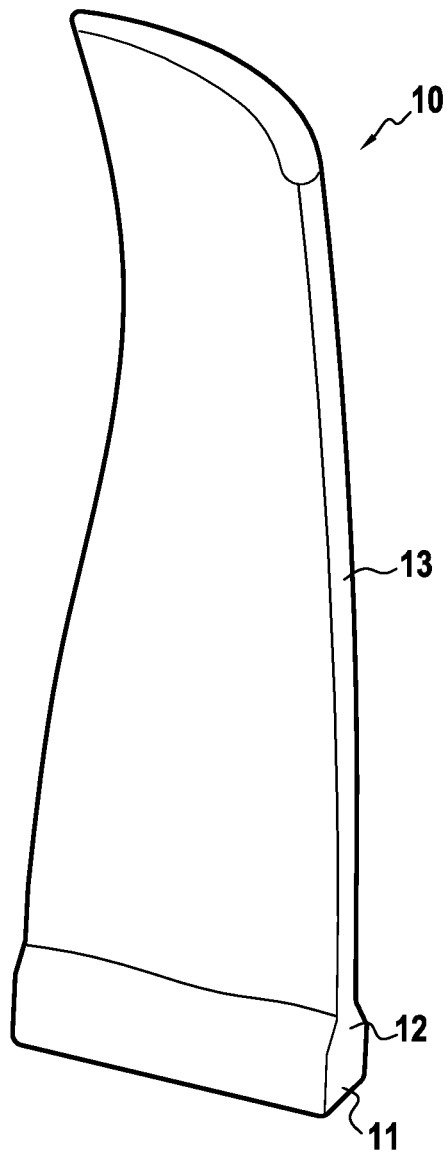
FIG. 9 is a diagrammatic perspective view of a blade made of composite material.

After densification, a blade 10 is obtained made of composite material that, as shown in FIG. 9, includes in its bottom portion a root 11 that is extended by a tang 12 and an airfoil 13.

The invention claimed is:

1. A method of making a fiber reinforcement preform, comprising:
    fabricating a fiber texture, the fabricating comprising
       weaving as a single part of a blank portion by three-dimensional weaving between a first plurality of yarn layers and a second plurality of yarn layers, said blank portion corresponding to all or part of the fiber reinforcement preform for a part made of composite material, wherein said fabricating further comprises, outside the blank portion, weaving one or more two-dimensional fabric layers, each two-dimensional fabric layer grouping together yarns of a single layer forming part of the first plurality of yarn layers after they have exited the blank portion, wherein each two-dimensional fabric layer extends outside the blank portion in the direction of the yarns of the layer of the first plurality of yarn layers grouped together in said two-dimensional fabric layer, and wherein each fabric layer that extends outside the blank portion is a two-dimensional fabric layer; and
    taking hold of each two-dimensional fabric layer and cutting the yarns of each two-dimensional fabric layer at a limit of the blank portion of the fiber structure.

2. A method according to claim 1, wherein the yarns of the first plurality of yarn layers correspond to warp yarns, whereas the yarns of the second plurality of yarn layers correspond to weft yarns, and wherein each two-dimensional fabric layer is woven adjacent to the blank portion.

3. A method according to claim 2, wherein, within each two-dimensional fabric layer the yarns of a single layer of warp yarns are woven together with the yarns of a single layer of weft yarns.

4. A method according to claim 1, wherein each two-dimensional fabric layer is woven at a determined distance from the blank portion.

5. A method according to claim 1, wherein the yarns of the first plurality of yarn layers correspond to warp yarns whereas the yarns of the second plurality of yarn layers correspond to weft yarns, the blank portion including a portion of decreasing thickness and a portion of increasing thickness, warp yarns being extracted from the blank portion via the portion of decreasing thickness and being reinserted into the blank portion via the portion of increasing thickness, and said method comprising weaving two-dimensional fabric layers grouping together the warp yarns extracted from the blank portion and belonging to a single layer of warp yarns.

6. A method according to claim 1, wherein the yarns of the first plurality of yarn layers correspond to warp yarns whereas the yarns of the second plurality of yarn layers correspond to weft yarns, the blank portion including a portion of decreasing thickness and a portion of increasing thickness, weft yarns being extracted from the blank portion via the portion of decreasing thickness and being reinserted into the blank portion via the portion of increasing thickness, said method comprising weaving two-dimensional fabric layers grouping together the weft yarns extracted from the blank portion and belonging to a single layer of weft yarns.

7. A method according to claim 5, further comprising forming a cutout in each two-dimensional fabric layer, the cutout being oriented perpendicularly relative to the direction of the yarns of the first plurality of layers.

8. The method according to claim 1, wherein the limit of the blank portion of the fiber structure defines a boundary between the three-dimensionally woven blank portion and the two-dimensional fabric layer.

9. A method according to claim 8, wherein the yarns of the first plurality of yarn layers correspond to warp yarns, whereas the yarns of the second plurality of yarn layers correspond to weft yarns, and wherein each two-dimensional fabric layer is woven adjacent to the blank portion.

10. A method according to claim 9, wherein, within each two-dimensional fabric layer the yarns of a single layer of warp yarns are woven together with the yarns of a single layer of weft yarns.

11. A method of making a fiber reinforcement preform, comprising:
    fabricating a fiber texture, the fabricating comprising
       weaving as a single part of a blank portion by three-dimensional weaving between a first plurality of yarn layers and a second plurality of yarn layers to form a three-dimensionally woven blank portion, said three-dimensionally woven blank portion corresponding to all or part of the fiber reinforcement preform for a part made of composite material, wherein said fabricating further comprises, outside an outline of the three-dimensionally woven blank portion, weaving one or more two-dimensional fabric layers, each two-dimensional fabric layer grouping together yarns of a single layer forming part of the first plurality of yarn layers after they have exited the blank portion, wherein each two-dimensional fabric layer extends outside the outline of the three-dimensionally woven blank portion in the direction of the yarns of the layer of the first plurality of yarn layers grouped together in said two-dimensional fabric layer, and wherein each fabric layer that extends outside the outline of the three-dimensionally woven blank portion is a two-dimensional fabric layer; and
    taking hold of each two-dimensional fabric layer and cutting the yarns of each two-dimensional fabric layer at the outline of the three-dimensionally woven blank of the fiber structure so that after said cutting all yarns of each two-dimensional fabric layer outside the outline of the three-dimensionally woven blank portion are removed.

12. A method according to claim 11, wherein each two-dimensional fabric layer is woven at a determined distance from the blank portion.

* * * * *